(12) United States Patent
Saitou et al.

(10) Patent No.: US 11,988,750 B2
(45) Date of Patent: May 21, 2024

(54) DISTANCE MEASUREMENT DEVICE AND IMAGE GENERATION METHOD

(71) Applicant: Panasonic Intellectual Property Management Co., Ltd., Osaka (JP)

(72) Inventors: Shigeru Saitou, Kyoto (JP); Shinzo Koyama, Osaka (JP); Motonori Ishii, Osaka (JP); Masato Takemoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 367 days.

(21) Appl. No.: 17/482,365

(22) Filed: Sep. 22, 2021

(65) Prior Publication Data

US 2022/0011436 A1  Jan. 13, 2022

Related U.S. Application Data

(63) Continuation of application No. PCT/JP2020/011668, filed on Mar. 17, 2020.

(30) Foreign Application Priority Data

Mar. 27, 2019 (JP) ................. 2019-060983

(51) Int. Cl.
*G01S 17/89* (2020.01)
*G01S 17/10* (2020.01)
(Continued)

(52) U.S. Cl.
CPC ............ *G01S 17/894* (2020.01); *G01S 17/10* (2013.01); *G06T 7/11* (2017.01)

(58) Field of Classification Search
CPC ...... G01S 17/894; G01S 17/10; G01S 7/4863; G01S 7/4873; G01S 17/89; G06T 7/11; G01C 3/06
(Continued)

(56) References Cited

U.S. PATENT DOCUMENTS 10,755,116 B2* 8/2020 Nakata ................. G05D 1/0246
2019/0012798 A1* 1/2019 Amano ..................... G06T 7/11
2020/0262113 A1  8/2020 Okashita et al.

FOREIGN PATENT DOCUMENTS

JP  2010-121995 A  6/2010
JP  2010121995 A *  6/2010
(Continued)

OTHER PUBLICATIONS

International Search Report issued in corresponding International Patent Application No. PCT/JP2020/011668, dated Jun. 16, 2020, with English translation.

*Primary Examiner* — Neil R McLean
(74) *Attorney, Agent, or Firm* — Rimon P.C.

(57) ABSTRACT

A distance measurement device includes: an image capturer that captures N segmental images corresponding to N segmental distances into which a distance measurement range is divided; and a range image generator that generates a range image from the N segmental images. The range image generator determines: among segmental pixels included in the N segmental images, a segmental pixel having a maximum signal value from N segmental pixels at the same pixel position among pixel positions; a value indicating a segmental distance of the segmental pixel having the maximum signal value to be a distance value of the pixel position of the range image, when the maximum signal value is greater than or equal to a threshold; and a value indicating a value outside the distance measurement range to be the distance value of
(Continued)

the pixel position of the range image, when the maximum signal value is less than the threshold.

17 Claims, 15 Drawing Sheets

(51) Int. Cl.
  *G01S 17/894* (2020.01)
  *G06T 7/11* (2017.01)
(58) Field of Classification Search
  USPC .......................................................... 382/154
  See application file for complete search history.

(56) References Cited

FOREIGN PATENT DOCUMENTS

| | | |
|---|---|---|
| JP | 2011-17640 A | 1/2011 |
| JP | 6427998 B2 | 11/2018 |
| JP | 2019-177304 A | 10/2019 |

* cited by examiner

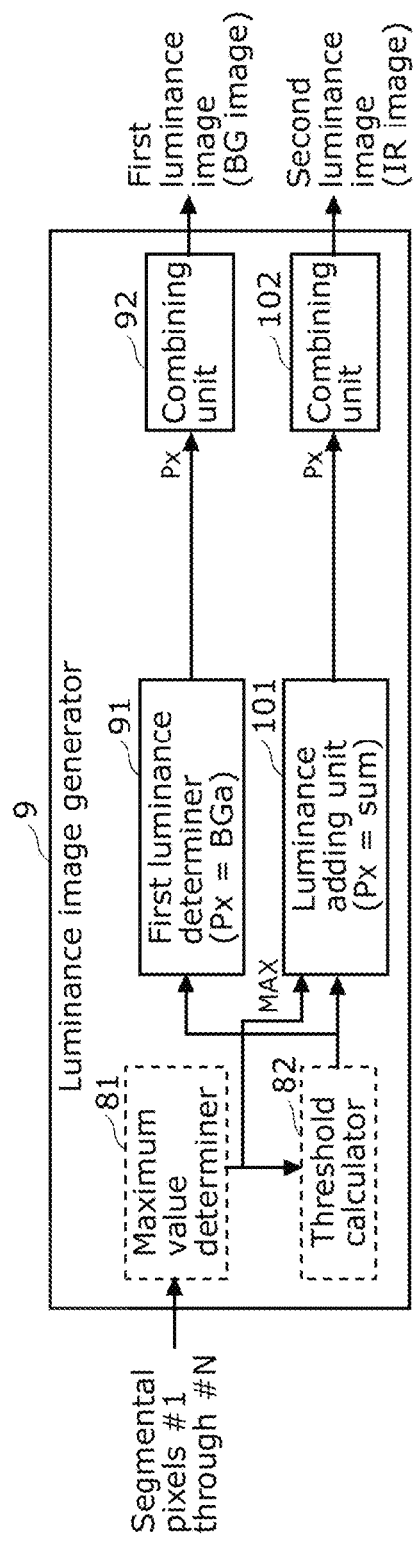

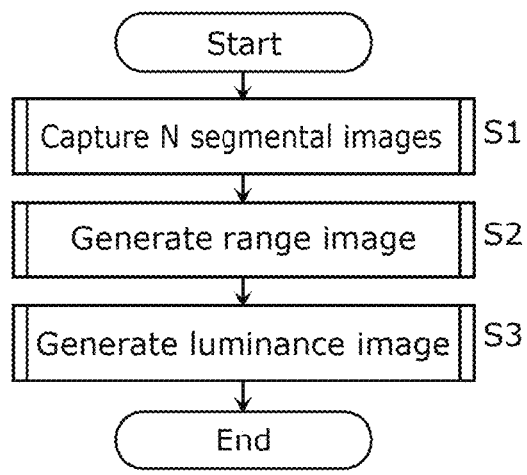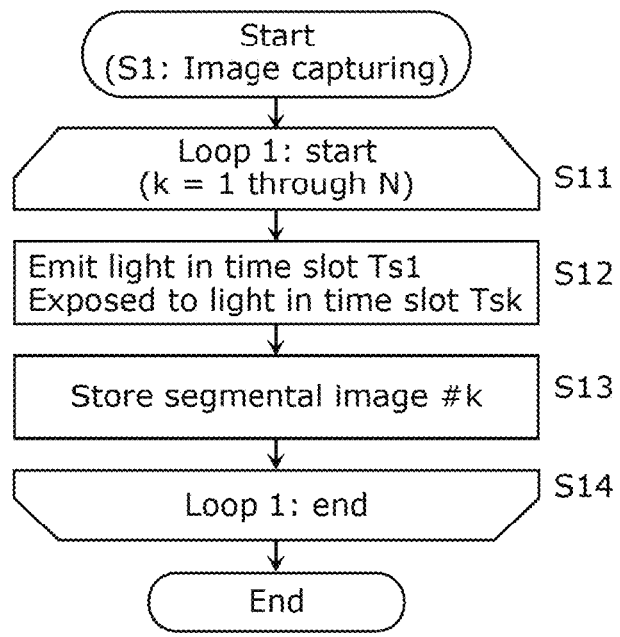

25 m    50 m    55 m    40 m    Out of range 25 m    50 m    55 m    40 m

DISTANCE MEASUREMENT DEVICE AND IMAGE GENERATION METHOD

CROSS REFERENCE TO RELATED APPLICATIONS

This is a continuation application of PCT International Application No. PCT/JP2020/011668 filed on Mar. 17, 2020, designating the United States of America, which is based on and claims priority of Japanese Patent Application No. 2019-060983 filed on Mar. 27, 2019. The entire disclosures of the above-identified applications, including the specifications, drawings and claims are incorporated herein by reference in their entirety.

FIELD

The present disclosure relates to a distance measurement device and an Image generation method.

BACKGROUND

Patent Literature (PTL) 1 discloses an optical flight type distance measuring device provided with a reliability determination means of determining the reliability of a calculation result obtained by a time of flight (TOF) distance calculation means, and selecting, based on the determination result, either the calculation result obtained by using the TOF distance calculation means or a calculation result obtained by using an image distance calculation means as a device output. The reliability determination means compares, with a predetermined fixed level, the degree of variation in the calculation results which the TOF distance calculation means obtains by calculating between a plurality of frames in units of pixels to determine the reliability of the calculation results obtained by the TOF distance calculation means. When it is determined that the degree of variation is less than the predetermined fixed level and that the reliability of the calculation results obtained by the TOF distance calculation means is relatively high, the calculation results obtained by the TOF distance calculation means are selected as device outputs. Alternatively, when it is determined that the degree of variation is greater than or equal to the predetermined fixed level and that the reliability of the calculation results obtained by the TOF distance calculation means is relatively low, the calculation results obtained by the image distance calculation means are selected as device outputs. With this, PTL 1 aims to address an issue concerning a reduction in distance measurement accuracy resulting from saturation of a pixel capacity and a reduction in a relative intensity of reflected light in an environment in which intensity of disturbance light is great.

CITATION LIST

Patent Literature

PTL 1: Japanese Patent No. 6427998

SUMMARY

Technical Problem

However, the above-mentioned related art presents a problem of a reduction in distance measurement accuracy due to an influence of background light.

The present disclosure aims to provide a distance measurement device and an image generation method which inhibit a reduction in distance measurement accuracy due to background light.

Solution to Problem

In order to provide such a distance measurement device, a distance measurement device according to an embodiment of the present disclosure includes: an image capturer that captures N segmental images corresponding to N segmental distances into which a distance measurement range is divided, N being an integer of 2 or more; and a range image generator that generates a range image from the N segmental images. The range image generator determines: among segmental pixels included in the N segmental images, a segmental pixel having a maximum signal value from N segmental pixels at a pixel position among pixel positions, the pixel position being a same pixel position in the N segmental images; a value indicating a segmental distance of the segmental pixel having the maximum signal value to be a distance value of the pixel position of the range image, when the maximum signal value is greater than or equal to a threshold; and a value indicating a value outside the distance measurement range to be the distance value of the pixel position of the range image, when the maximum signal value is less than the threshold.

In addition, an image generation method according to an embodiment of the present disclosure is an image generation method for generating a range image. The image generation method includes: capturing N segmental images corresponding to N segmental distances into which a distance measurement range is divided, N being an integer of 2 or more; determining, among segmental pixels included in the N segmental images, a segmental pixel having a maximum signal value from N segmental pixels at a pixel position among pixel positions, the pixel position being a same pixel position in the N segmental images; determining a value indicating a segmental distance of the segmental pixel having the maximum signal value to be a distance value of the pixel position of the range image, when the maximum signal value is greater than or equal to a threshold; and determining a value indicating a value outside the distance measurement range to be the distance value of the pixel position of the range image, when the maximum signal value is less than the threshold.

Advantageous Effects

A distance measurement device and an image generation method according to the present disclosure can inhibit a reduction in distance measurement accuracy due to background light.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5C is a block diagram illustrating Configuration example 3 of the luminance image generator according to the embodiment.

FIG. 6 is a flowchart illustrating an example of overall processing performed by the distance measurement device according to the embodiment.

FIG. 7 is a flowchart illustrating an example of processing performed for capturing segmental images in step S1 of FIG. 6.

Figure 1:
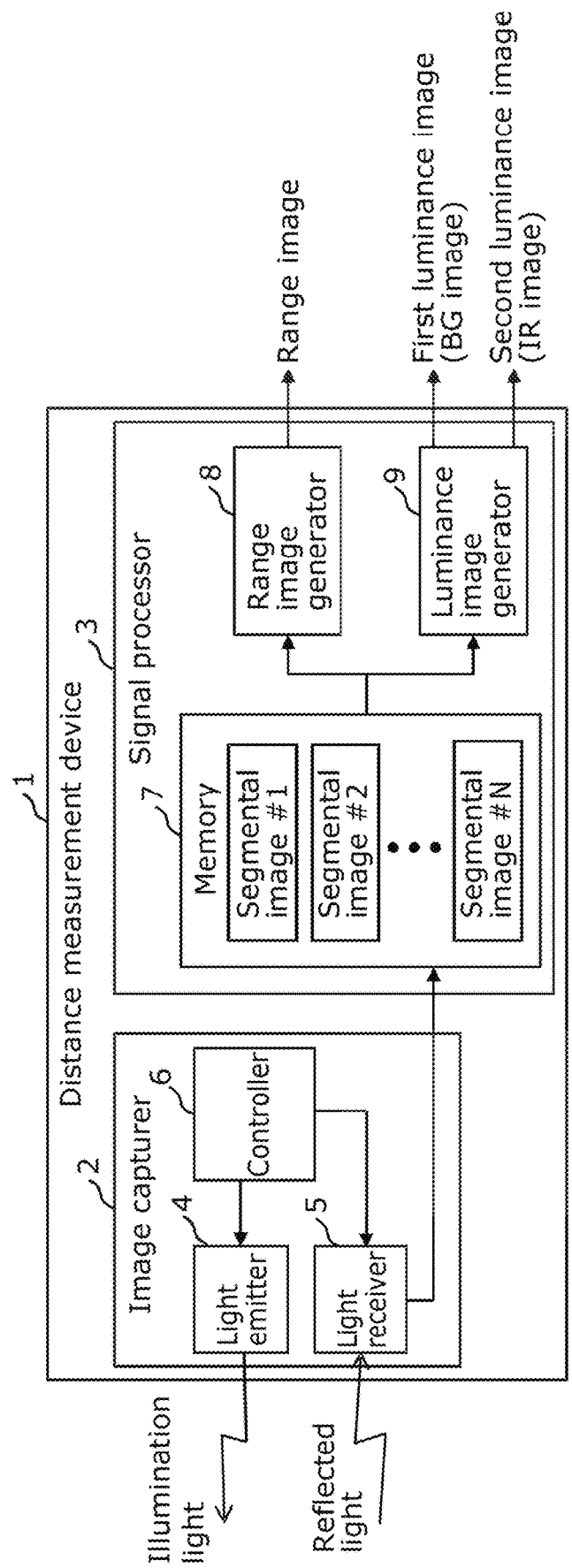
FIG. 1 is a block diagram illustrating a configuration example of a distance measurement device according to an embodiment.

DESCRIPTION OF EMBODIMENT (Underlying Knowledge Forming Basis of the Present Disclosure)

The inventors of the present disclosure have found the following problems about the conventional distance measuring device described in Background.

The distance measuring device according to PTL 1 calculates distance value D and luminance value A based on equation (1) through equation (3).

$$\varphi = \tan^{-1}[(C1-C3)/(C2-C4)] \quad \text{equation (1)}$$

$$D = (\varphi/2\pi) \cdot (c/2f) \quad \text{equation (2)}$$

$$A = (C1+C2+C3+C4)/4 \quad \text{equation (3)}$$

Here, the symbol $\varphi$ denotes a phase difference (delay time) arose from time of flight which is time taken by light to travel to and from a target object, and is defined by equation (1). The terms C1 through C4 denote charge amounts obtained by an exposure in respective cycles in which a phase is shifted by 0°, 45°, 90°, and 135° with respect to a light emission cycle of pulsed light emission. The letter c denotes speed of light, and the letter f denotes a frequency of light emission and an exposure (the inverse of the above-described light emission cycle). PTL 1 discloses that "[i]n the above equation (1), since the charge amount of the background light is canceled, the phase difference can be calculated without being affected by the background light."

However, if a difference in timing between light emission and an exposure and a difference in an environment in which a distance is measured exist, distance measurement accuracy may degrade due to an influence of background light.

For example, charge amount C1 includes reflected light component s1 and background light component b1 as expressed by expression (4). Charge amounts C2, C3, and C4 can also be expressed by expressions (5), (6), and (7), respectively.

$$C1 = s1+b1 \quad \text{expression (4)}$$

$$C2 = s2+b2 \quad \text{expression (5)}$$

$$C3 = s3+b3 \quad \text{expression (6)}$$

$$C4 = s4+b4 \quad \text{expression (7)}$$

Accordingly, equation (1) and equation (3) can be expressed by the following expression (8) and expression (9), respectively.

$$\varphi = \tan^{-1}[(s1+b1-s3-b3)/(s2+b2-s4-b4)] \quad \text{expression (8)}$$

$$A = (s1+b1+s2+b2+s3+b3+s4+b4)/4 \quad \text{expression (9)}$$

As expressed by expressions (8) and (9), the following issues (i) through (iii) concerning distance value D and luminance value A may arise.

(i) Accuracy of distance value D is reduced. For example, background light components "b1 through b3" in expression (8) are included as noise, thereby degrading an S/N ratio. In other words, accuracy of a range image may be reduced.

(ii) Contrast of luminance value A is caused to be reduced. For example, background light components (b1 through b4) are superimposed on reflected light components (s1 through s4) in expression (9). Accordingly, luminance value A includes a background light component (the mean of b1 through b4). As a result, contrast of a luminance image may be reduced.

(iii) Distance value D indicates a distance value obtained by falsely measuring a distance value outside a distance measurement range. Here, a distance value outside a distance measurement range is a distance value obtained when a subject is not present within a distance measurable range (or when there is no reflected light). Essentially, the distance value outside a distance measurement range should likely be a value indicating infinity. However, a distance value outside a distance measurement range may indicate a false distance resulting from background light components according to equation (1) and equation (2).

In view of the above, the first aim of the present disclosure is to provide, in response to issue (i), a distance measurement device and an image generation method which inhibit a reduction in distance measurement accuracy due to background light.

In addition, the second aim of the present disclosure is to provide, in response to issue (ii), a distance measurement device and an image generation method which inhibit a reduction in contrast of a luminance image.

Moreover, the third aim of the present disclosure is to provide, in response to issue (iii), a distance measurement device and an image generation method which inhibit a false measurement of measuring a distance outside a distance measurement range.

In order to provide such a distance measurement device, a distance measurement device according to an aspect of the present disclosure includes: an image capturer that captures N (N is an integer of 2 or more) segmental images corresponding to N segmental distances into which a distance measurement range is divided; and a range image generator that generates a range image from the N segmental images. The range image generator determines: among segmental pixels included in the N segmental images, a segmental pixel having a maximum signal value from N segmental pixels at the same pixel position among pixel positions of the N segmental Images; a value indicating a segmental distance of the segmental pixel having the maximum signal value to be a distance value of the pixel position of the range image, when the maximum signal value is greater than or equal to a threshold; and a value indicating a value outside the distance measurement range to be the distance value of the pixel position of the range image, when the maximum signal value is less than the threshold.

The distance measurement device having a configuration as such can inhibit a reduction in distance measurement accuracy due to background light. Since a pixel value as a distance value of a range image indicates any one of distance ranges of N segmental distances, and is not calculated based on a charge amount (including a background light component) as expressed by equation (1) and equation (2), it is unlikely that the distance measurement device is affected by background light. Furthermore, the above distance measurement device can inhibit a false measurement of measuring a distance outside a distance measurement range.

Hereinafter, embodiments will be described in detail with reference to the drawings. Note that the embodiments described below each show a particular example according to the present disclosure. Therefore, the numerical values, shapes, materials, structural elements, the arrangement and connection of the structural elements, steps, the order of the steps, and the like described in the following embodiments are mere examples, and thus are not intended to limit the present disclosure. Furthermore, among the structural elements in the embodiments below, those not recited in any one of the independent claims defining the broadest concept of the present disclosure will be described as optional structural elements for configuring other particular embodiments. It should be noted that the drawings are schematic diagrams, and do not necessarily provide strictly accurate dimensions.

EMBODIMENT

[1.1 Configuration of Distance Measurement Device 1]

First, a configuration of distance measurement device 1 according to an embodiment will be described.

FIG. 1 is a block diagram illustrating a configuration example of a distance measurement device according to an embodiment. As illustrated in FIG. 1, distance measurement device 1 includes image capturer 2 and signal processor 3. Image capturer 2 includes light emitter 4, light receiver 5, and controller 6. Signal processor 3 includes memory 7, range image generator 8, and luminance image generator 9.

Image capturer 2 repeatedly performs a set of pulsed light emission and an exposure N (N is an integer of 2 or more) times to capture N segmental images corresponding to N segmental distances into which a distance measurement range is divided. Here, the distance measurement range indicates the entire measurable distance range from distance measurement device 1 to a subject. For example, a distance measurement range covers from 0 m to Dmax m. The N segmental distances each are a partial distance range obtained by equally dividing the distance measurement range by N, for example. Note that the N segmental distances are not limited to N equal partial distance ranges, but may be partial distance ranges obtained by unequally dividing the distance measurement range. For example, it may be determined that the N segmental distances include a segmental distance having a small distance range and a segmental distance having a large distance range, depending on a target subject to measurement and an environment in which measurement is performed by distance measurement device 1.

Light emitter 4 emits pulsed illumination light according to a light emission control signal commanding pulsed light emission. Illumination light emitted by light emitter 4 includes infrared light.

Light receiver 5 is an image sensor including two-dimensionally arrayed pixels, for example. Light receiver 5 is exposed to light according to an exposure control signal commanding an exposure.

Controller 6 supplies a light emission control signal and an exposure control signal to light emitter 4 and light receiver 5, respectively, to control light emitter 4 and light receiver 5 for capturing N segmental images. Specifically, controller 6 controls the light emitter and the light receiver by generating light emission control signals and exposure control signals so as to generate N sets of a light emission pulse and an exposure pulse per one frame of a range image.

Hereinafter, N segmental images captured by image capturer 2 will be described in detail with reference to FIG. 2 and FIG. 3.

Figure 2:
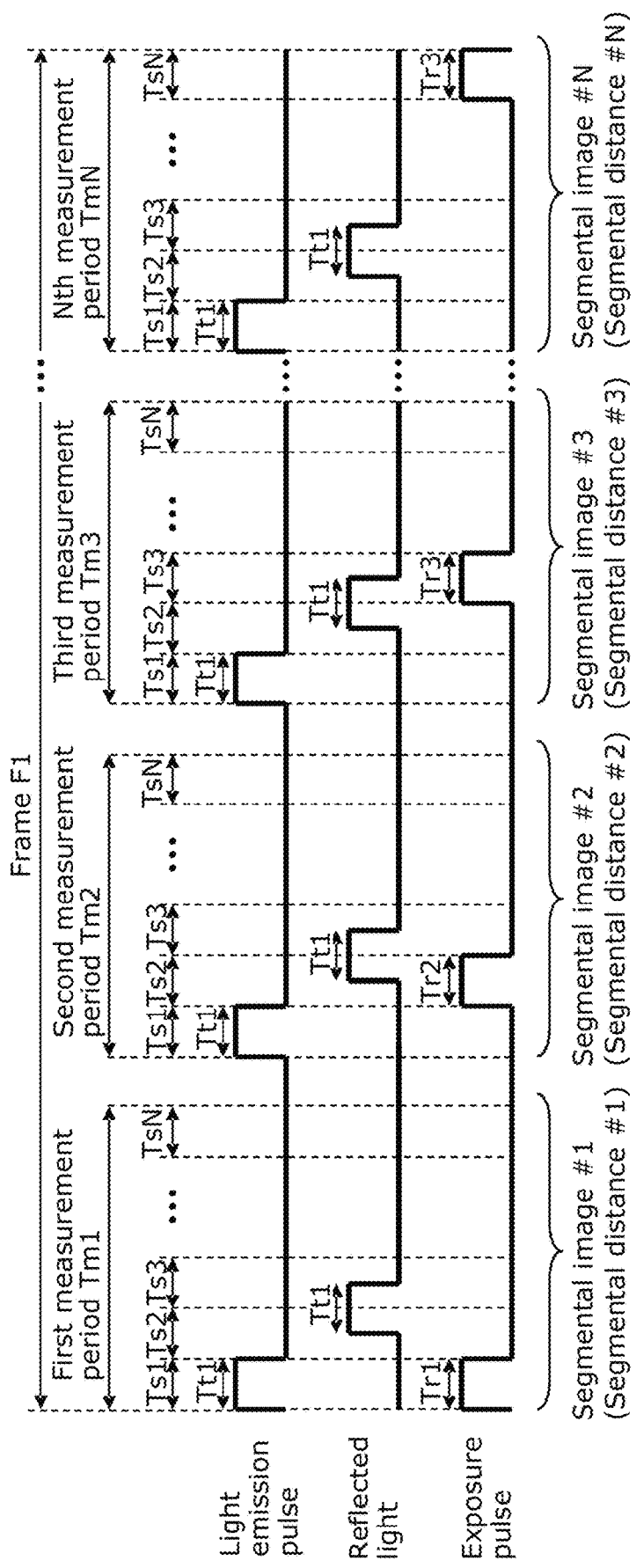
FIG. 2 is a time chart illustrating an example of image capturing processing performed for capturing one frame by an image capturer according to the embodiment.

FIG. 2 is a time chart illustrating an example of image capturing processing performed for capturing one frame by image capturer 2 according to the embodiment.

The horizontal axis in FIG. 2 represents time. An image capturing period for capturing one frame F1 includes N measurement periods from first measurement period Tm1 through Nth measurement period TmN. Each of the measurement periods from first measurement period Tm1 through Nth measurement period TmN includes N time slots Ts1 through TsN into which a measurement period is equally divided by N.

The "light emission pulse" indicated on the vertical axis indicates a pulse commanding light emission which is included in a light emission control signal supplied from controller 6 to light emitter 4. Light emitter 4 emits pulsed light by emitting light in a high-level interval of the light emission control signal, and ceases light emission in a low-level interval of the light emission control signal. Controller 6 generates, for every measurement period from first measurement period Tm1 to Nth measurement period TmN, a light emission pulse commanding light emission in an interval of time slot Ts1 which is the head of every measurement period.

The "reflected light" indicated on the vertical axis schematically indicates an example of reflected light reflected off a subject illuminated with pulsed light emitted from light emitter 4. Timing at which reflected light appears is proportional to a distance between distance measurement device 1 and a subject. FIG. 2 illustrates an example in which reflected light appears between the latter half of time slot Ts2 and the first half of time slot Ts3.

"Exposure pulse" indicated on the vertical axis indicates a pulse commanding an exposure which is included in an exposure control signal supplied from controller 6 to light receiver 5. Light receiver 5 is exposed to light in a high-level interval of the exposure control signal, and is not exposed to light in a low-level interval of the exposure control signal.

Controller 6 generates an exposure pulse such that a time difference between a light emission timing and an exposure timing gradually increases in measurement periods from first measurement period Tm1 to Nth measurement period TmN. A time difference between a light emission timing and an exposure timing corresponds to a distance (distance range) between distance measurement device 1 and a subject that generates a reflected wave to be received by light receiver 5 in a measurement period. In other words, when reflected light is received in a measurement period, a distance from distance measurement device 1 to the subject corresponds to the time difference.

Accordingly, controller 6 generates, in an interval of time slot Tsk in measurement period Tmk, an exposure pulse commanding an exposure. Here, the letter k denotes any one of integers 1 through N.

For example, controller 6 generates, in measurement period Tm1, an exposure pulse commanding an exposure in an interval of time slot Ts1. Light receiver 5 generates, as segmental image #1, an image generated by the exposure in time slot Ts1. For example, assuming that a time period for each time slot spans 10 ns, light receiver 5 can receive reflected light that appears within 10 ns from the beginning of pulsed light emission in time slot Ts1, but cannot receive reflected light that appears after the 10 ns. In other words, as expressed by expression (11), light receiver 5 can receive reflected light reflected off a subject present within a distance range of segmental distance #1 ranging from 0 m to 1.5 m in time slot Ts1, and cannot receive reflected light reflected off a subject present outside segmental distance #1.

$$2 \times L1 < 10 \text{ ns} \times c \qquad \text{expression (11)}$$

Here, the letter c denotes the speed of light ($3 \times 10^8$ m/s). The term L1 denotes a distance range of segmental distance #1. The expression $2 \times L1$ indicates a distance that illumination light travels to and from a subject.

As described above, reception of a reflected wave reflected off a subject in first measurement period Tm1 means that the subject is present within a range of segmental distance #1 (e.g., 0 m to 1.5 m).

Similarly, controller 6 generates an exposure pulse commanding an exposure in an interval of time slot Tsk in measurement period Tmk. Light receiver 5 generates, as segmental image #k, an image generated by the exposure in time slot Tsk. For example, when a time period for each time slot spans 10 ns, light receiver 5 can receive reflected light that appears in an interval of time slot Tsk in kth measurement period Tmk, but cannot receive reflected light that appears in intervals other than the interval of time slot Tsk. In other words, as expressed by expression (12), light receiver 5 can receive reflected light reflected off a subject present in distance range Lk (a distance range from $(k-1) \times 1.5$ m to $k \times 1.5$ m), and cannot receive reflected light reflected off a subject present within a distance range other than distance range Lk.

$$(k-1) \times 10 \text{ ns} \times c < 2 \times Lk < k \times 10 \text{ ns} \times c \qquad \text{expression (12)}$$

The expression $2 \times Lk$ indicates a distance that illumination light travels to and from a subject.

As described above, reception of reflected light reflected off a subject in kth measurement period Tmk means that the subject is present within a range of segmental distance #k (e.g., a distance range from $(k-1) \times 1.5$ m to $k \times 1.5$ m).

Next, an appearance of a reflected wave in N segmental images will be described.

Figure 3:
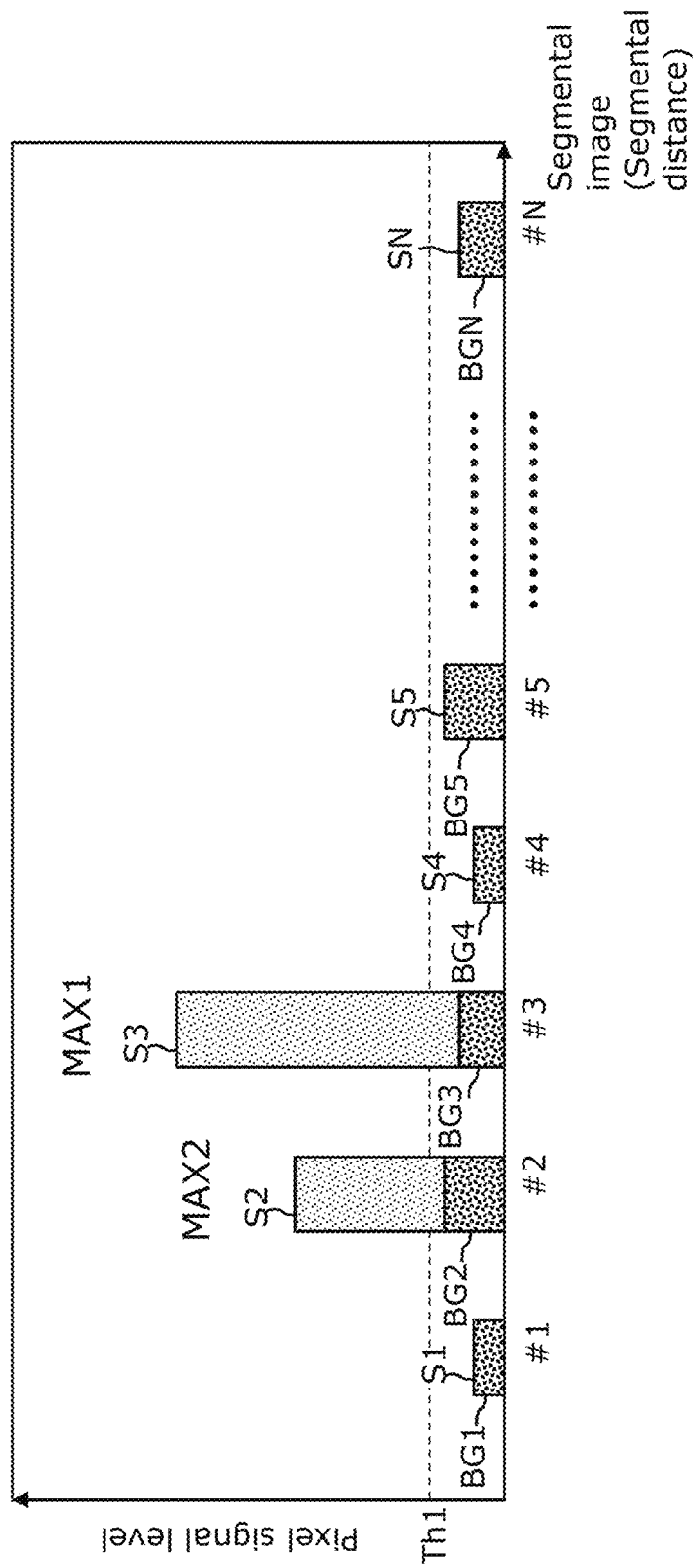
FIG. 3 is a diagram illustrating an example of pixel signal levels of segmental images according to the embodiment.

FIG. 3 is a diagram illustrating an example of pixel signal levels of N segmental pixels at the same pixel position among segmental pixels included in N segmental images according to the embodiment. The horizontal axis represents, among segmental pixels included in segmental images #1 through #N, N segmental pixels #1 through #N at the same pixel position. N segmental pixels #1 through #N correspond to segmental distances #1 through #N. The vertical axis represents pixel signal levels of segmental pixels #1 through #N.

Since a pulse width of light emission and a pulse width of an exposure are the same in FIG. 2, a pulsed reflected wave appears so as to spread across a boundary between two adjacent time slots in most of the cases. A pulsed reflected wave very occasionally appears within a single time slot. FIG. 3 illustrates two adjacent segmental pixels #2 and #3 whose pixel signal levels are the second maximum value MAX2 and the maximum value MAX1, respectively. Two adjacent segmental pixels #2 and #3 each show a reflected wave reflected off a subject. In this case, the subject is present within a distance indicated by the mean of the two segmental distances #2 and #3. For example, when each time slot spans 10 ns, a distance from distance measurement device 1 to the subject is determined to be, approximately, $(3.0+4.5)/2=3.75$ m, which is the mean of the two segmental distances #2 and #3.

Memory 7 temporarily stores N segmental images #1 through #N generated by image capturer 2.

Range image generator 8 generates a range image from N segmental images #1 through #N stored in memory 7. The range image includes pixel values each of which indicates a distance.

Luminance image generator 9 generates a first luminance image and a second luminance image from N segmental images #1 through #N stored in memory 7. Here, the first luminance image is independent of reflected light resulting from pulsed light emission, and is dependent on background light. Hereinafter, the first luminance image is also referred to as a BG image. The term BG is an abbreviation for background. The second luminance image is dependent on reflected light resulting from pulsed light emission. Hereinafter, the second luminance image is also referred to as an IR image. The term IR is an abbreviation for infrared.

Note that in FIG. 2, time slots in each measurement period need not be equally divided time slots, and may be unequally divided time slots.

[1.2 Configuration of Range Image Generator 8]

Next, a configuration of range image generator 8 will be described in detail.

Figure 4:
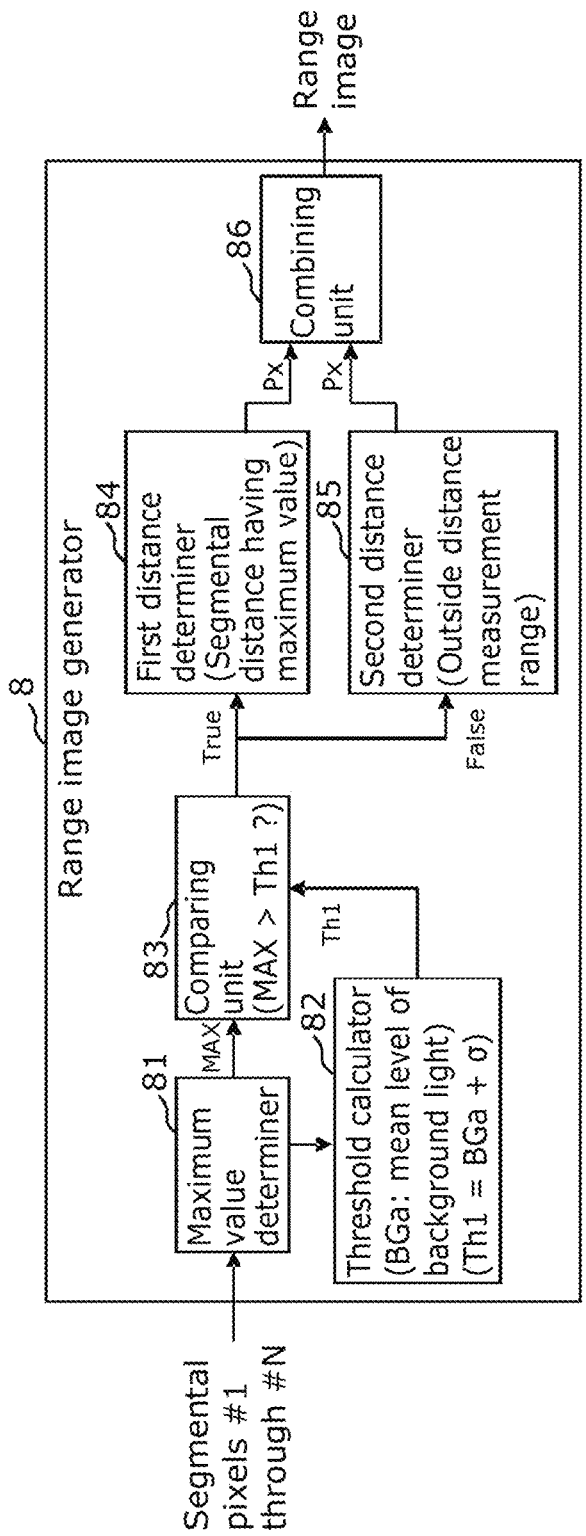
FIG. 4 is a block diagram illustrating a configuration example of a range image generator according to the embodiment.

FIG. 4 is a block diagram illustrating a configuration example of range image generator 8 according to the embodiment. Range image generator 8 illustrated in FIG. 4 includes maximum value determiner 81, threshold calculator 82, comparing unit 83, first distance determiner 84, and second distance determiner 85, and combining unit 86.

Maximum value determiner 81 determines a segmental pixel having the maximum value MAX1 among N segmental pixels #1 through #N at the same pixel position among segmental pixels included in N segmental images #1 through #N generated by light emitter 4, and outputs the maximum value MAX1 and a segmental pixel number (#) of the segmental pixel having the maximum value MAX1. Hereinafter, any number of segmental images #1 through #N, segmental pixels #1 through #N, or segmental distances #1 through #N may be simply indicated by the symbol #.

Threshold calculator 82 dynamically calculates, for each of pixel positions, threshold Th1 according to pixel values of N segmental pixels #1 through #N. Specifically, for each pixel position, threshold calculator 82 (i) excludes at least one segmental pixel including a segmental pixel having the maximum value MAX1 from N segmental pixels #1 through #N, (ii) calculates mean value BGa of segmental pixels remaining after exclusion of the at least one segmental pixel, and (iii) calculates a threshold based on mean value BGa. For example, threshold calculator 82 calculates threshold Th1 by adding offset σ to mean value BGa. Here, threshold calculator 82 dynamically determines, for each pixel position, offset σ according to mean value BGa. Offset a may be, for example, the square root of mean value BGa, a standard deviation indicating a variation in background light, or a value corresponding to a difference between the maximum value of background light and mean value BGa.

Mean value BGa is the mean of segmental pixels remaining after exclusion of a segmental pixel that has received reflected light from N segmental distances #1 through #N. Mean value BGa indicates the mean level of background light. The above-mentioned "at least one segmental pixel" includes two segmental pixels that are a segmental pixel having the maximum value MAX1 and a segmental pixel having the second largest value MAX2 among N segmental pixels #1 through #N. The two segmental pixels belong to two adjacent segmental distances. Alternatively, the above-mentioned "at least one segmental pixel" includes a single segmental pixel having the maximum value MAX1, when a segmental pixel having the maximum value MAX1 and a segmental pixel having the second largest value MAX2 do not belong to two adjacent segmental distances.

Comparing unit 83 compares the maximum value MAX1 and threshold Th1, and determines whether the maximum value MAX1 is greater than or equal to threshold Th1.

When it is determined that the maximum value MAX1 is greater than or equal to threshold Th1, first distance determiner 84 determines a value indicating a segmental distance of a segmental pixel having the maximum value MAX1 to be a pixel value of pixels at the same position in a range image.

When it is determined that the maximum value MAX1 is not greater than or equal to threshold Th1, second distance determiner 85 determines a value indicating absence of a subject within a distance measurement range to be a pixel value of pixels at the same position in the range image. The value indicating absence of a subject within a distance measurement range means a value indicating that the subject is present outside a distance measurement range, or a value indicating infinity that denotes a background. The value indicating absence of a subject within a distance measurement range may be a particular value other than a value indicating a distance within a distance measurement range.

Combining unit 86 combines pixel values determined by first distance determiner 84 and second distance determiner 85, and generates a range image.

Range image generator 8 illustrated in FIG. 4 can inhibit a reduction in distance measurement accuracy due to background light. Specifically, a pixel value determined by first distance determiner 84 is not calculated based on a charge amount (including a background light component) as expressed by equation (1) and equation (2), but indicates any one of distance ranges of N segmental distances #1 through #N. Accordingly, it is unlikely that range image generator 8 is affected by background light, and thereby inhibiting a reduction in distance measurement accuracy.

In addition, since a pixel value determined by second distance determiner 85 is a particular value indicating absence of a subject within a distance measurement range, it is possible to inhibit a false measurement of measuring a distance value outside a distance measurement range. Moreover, since threshold Th1 is dynamically calculated based on the mean value of background light for each pixel position, it is possible to inhibit a reduction in distance measurement accuracy due to background light, even when the background light greatly changes by being dependent on an environment of distance measurement device 1, and even when the background light varies due to an occurrence of shot noise in the background light.

Next, Configuration example 1 through Configuration example 3 of luminance image generator 9 will be described.

[1.3 Configuration Example 1 of Luminance Image Generator 9]

First, Configuration example 1 of luminance image generator 9 will be described in detail.

Figure 5A:
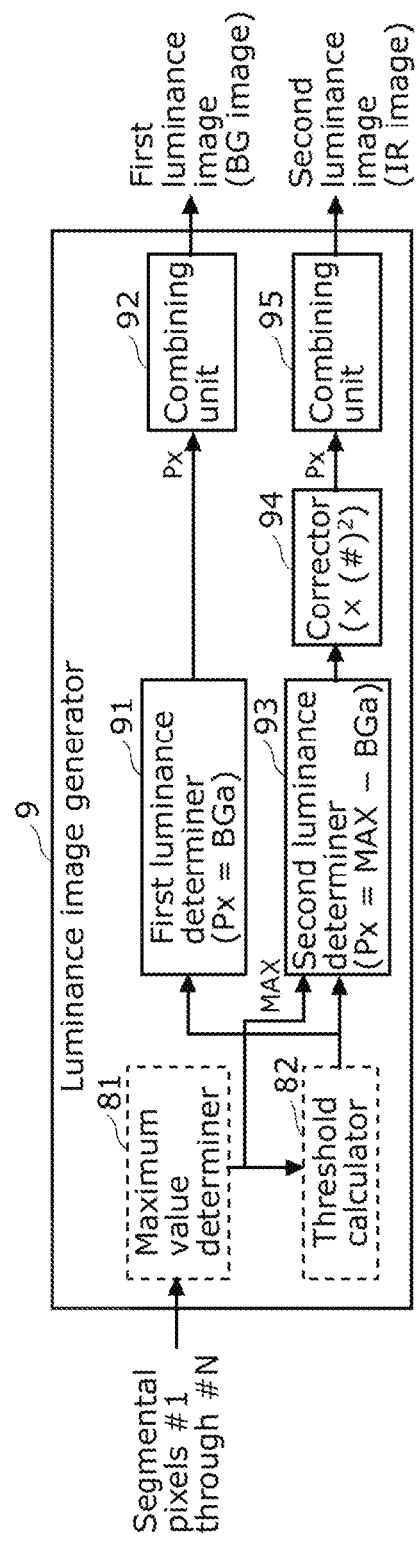
FIG. 5A is a block diagram illustrating Configuration example 1 of a luminance image generator according to the embodiment.

FIG. 5A is a block diagram illustrating Configuration example 1 of luminance image generator 9 according to the embodiment. Luminance image generator 9 illustrated in FIG. 5A includes first luminance determiner 91, combining unit 92, second luminance determiner 93, corrector 94, and combining unit 95. Note that maximum value determiner 81 and threshold calculator 82 illustrated in FIG. 5A are not the structural elements included in luminance image generator 9, but are illustrated for the convenience of enhancing understanding of the configuration.

First luminance determiner 91 determines, for each pixel position, a value corresponding to mean value BGa to be pixel value Px of a first luminance image which is independent of reflected light. For example, pixel value Px of a first luminance image is determined to be a value of mean value BGa.

Combining unit 92 two-dimensionally combines pixel values Px determined by first luminance determiner 91, and generates one frame of a first luminance image (BG image).

Second luminance determiner 93 determines, for each pixel position, a value corresponding to a value obtained by subtracting mean value BGa from the maximum value to be a pixel value of a second luminance image. Specifically, second luminance determiner 93 determines, for each pixel position, a value obtained by subtracting mean value BGa from the maximum value according to expression (13) or expression (14) to be pixel value Px. More specifically, pixel value Px is calculated using expression (13) when a segmental pixel having the maximum value MAX1 and a segmental pixel having the second largest value MAX2 belong to two adjacent segmental distances. Alternatively, pixel value Px is calculated using expression (14) when a segmental pixel having the maximum value MAX1 and a segmental pixel having the second largest value MAX2 do not belong to two adjacent segmental distances.

$$Px=(MAX1+MAX2)/2-BGa \qquad \text{expression (13)}$$

$$Px=MAX1-BGa \qquad \text{expression (14)}$$

Subtraction of mean value BGa from the maximum value according to expression (13) or expression (14) causes reflected light components and background light components to be superimposed in a second luminance image, thereby inhibiting a reduction in contrast. For example, when a reflected wave reflected off a subject is received in time slots Ts2 and Ts3 as exemplified in FIG. 2, a pixel signal level of each of segmental pixels #2 and #3 increases as exemplified in FIG. 3. In FIG. 3, segmental pixel #3 has a pixel signal level of the maximum value MAX1. Segmental pixel #2 has a pixel signal level of the second largest value MAX2. It is considered that pixel signal level S2 (MAX2) of segmental pixel #2 includes background light component BG2. It is considered that pixel signal level S3 (MAX1) of segmental pixel #3 includes background light component BG3. In contrast, a pixel signal level (S1, and S4 through SN) of each of segmental pixels other than segmental pixels #2 and #3 does not include a reflected light component, and solely indicates a background light component (BG1, and BG4 through BGN). Although it is difficult or impossible to directly measure a signal level of each of background light components BG2 and BG3, the signal level can be estimated from signal levels of background light components of other segmental pixels. For example, a signal level of each of background light components BG2 and BG3 can be estimated to be equivalent to mean value BGa of background light. Expression (13) and expression (14) each exclude a background light component from a signal level in which a background light component is superimposed on a reflected light component.

Accordingly, it is possible to inhibit a reduction in contrast of a second luminance image due to background light.

Corrector 94 corrects pixel value Px obtained from second luminance determiner 93 by using the square of a segmental distance corresponding to the maximum value. Specifically, when pixel value Px is calculated using expression (13), corrector 94 corrects pixel value Px by multiplying pixel value Px by the square of the mean of two segmental distances corresponding to MAX1 and MAX2. Alternatively, when pixel value Px is calculated using expression (14), corrector 94 corrects pixel value Px by multiplying pixel value Px by the square of a segmental distance corresponding to MAX1.

Accordingly, a signal level of reflected light that is inversely proportional to the square of a distance from distance measurement device 1 to a subject is corrected to a signal level independent of the distance. This correction inhibits a reduction in contrast of a second luminance image.

Combining unit 95 two-dimensionally combines pixel values Px corrected by corrector 94, and generates one frame of a second luminance image (IR image).

[1.4 Configuration Example 2 of Luminance Image Generator 9]

Next, Configuration example 2 of luminance image generator 9 will be described.

Figure 5B:
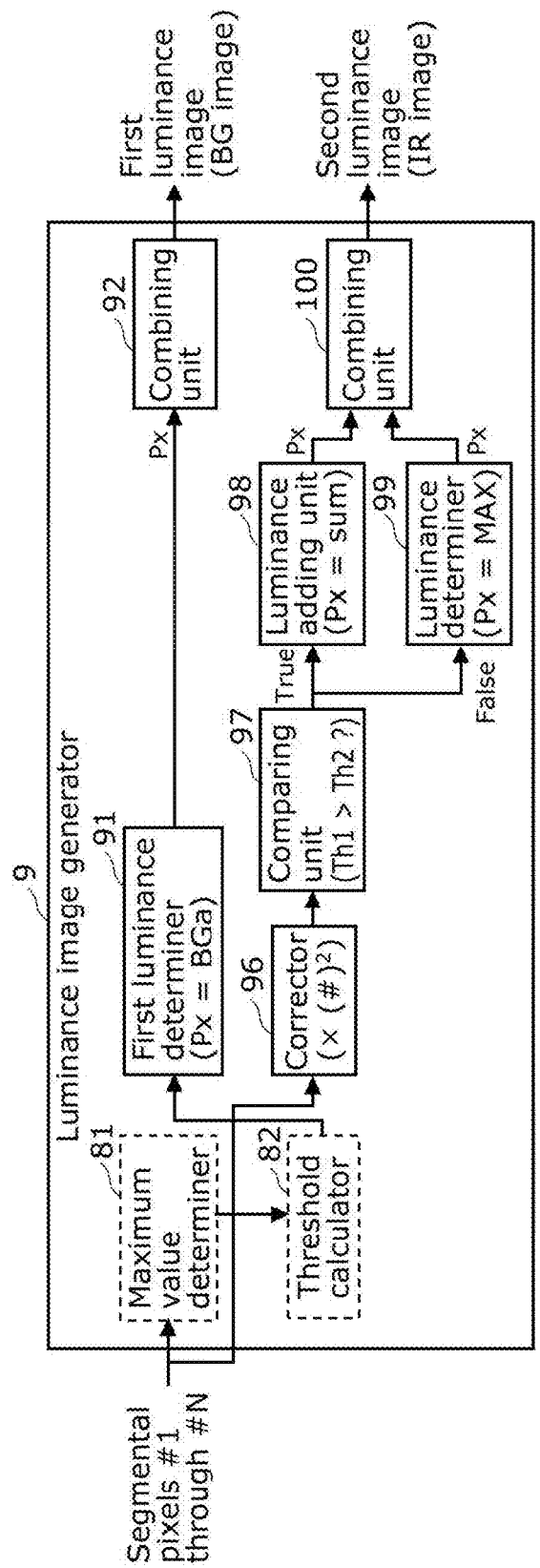
FIG. 5B is a block diagram illustrating Configuration example 2 of the luminance image generator according to the embodiment.

FIG. 5B is a block diagram illustrating Configuration example 2 of luminance image generator 9 according to the embodiment. As compared to FIG. 5A, luminance image generator 9 illustrated in FIG. 5B is different from luminance image generator 9 illustrated in FIG. 5A in that second luminance determiner 93, corrector 94, and combining unit 95 are excluded from the configuration, and in that corrector 96, comparing unit 97, luminance adding unit 98, luminance determiner 99, and combining unit 100 are added to the configuration. The following mainly describes different points, and avoids providing repetitional description.

Corrector 96, comparing unit 97, luminance adding unit 98, luminance determiner 99, and combining unit 100 generate a second luminance image (IR image).

Corrector 96 corrects a pixel value of each of N segmental pixels by using the square of a segmental distance corresponding to each N segmental pixel. Specifically, corrector 96 makes correction by multiplying a pixel value of each N segmental pixel by the square of a segmental distance corresponding to each N segmental pixel.

Comparing unit 97 compares threshold Th1 and predetermined value Th2, and determines whether threshold Th1 is greater than predetermined value Th2. Predetermined value Th2 is a threshold used for determining whether dynamically calculated threshold Th1 (i.e., mean value BGa of background light+offset σ) is large to the extent that threshold Th1 affects the image quality (e.g., contrast) of a second luminance image (IR Image). Predetermined value Th2 may be a static constant.

Luminance adding unit 98 determines, for each pixel position, a value corresponding to the sum of pixel signal levels of corrected N segmental pixels to be pixel value Px of a second luminance image, when it is determined that threshold Th1 Is greater than predetermined value Th2.

Luminance determiner 99 determines, for each pixel position, a value corresponding to the maximum value to be a pixel value of a second luminance image, when it is determined that threshold Th1 is not greater than predetermined value Th2.

Combining unit 100 combines pixel values determined by luminance adding unit 98 and luminance determiner 99, and generate a second luminance image (IR image).

Note that corrector 96 may correct a pixel value of each N segmental pixel using the square of a segmental distance corresponding to each N segmental pixel when it is determined that threshold Th1 is greater than predetermined value Th2. When it is determined that threshold Th1 is not greater than predetermined value Th2, corrector 96 may correct the maximum value using the square of a segmental distance corresponding to each N segmental pixel.

According to Configuration example 2 of luminance image generator 9, a signal level of reflected light and background light which is inversely proportional to the square of a distance from distance measurement device 1 to a subject is corrected to a signal level independent of the distance, thereby inhibiting a reduction in contrast of a second luminance image.

[1.5 Configuration Example 3 of Luminance Image Generator 9]

Next, Configuration example 3 of luminance image generator 9 will be described.

FIG. 5C is a block diagram illustrating Configuration example 3 of luminance image generator 9 according to the embodiment. As compared to FIG. 5A, luminance image generator 9 illustrated in FIG. 5C is different from luminance image generator 9 illustrated in FIG. 5A in that second luminance determiner 93, corrector 94, and combining unit 95 are excluded from the configuration, and in that luminance adding unit 101 and combining unit 102 are added to the configuration. The following mainly describes different points, and avoids providing repetitional description.

Luminance adding unit 101 and combining unit 102 generate a second luminance image (IR image).

Luminance adding unit 101 determines, for each pixel position, a value corresponding to the sum of pixel signal levels of N segmental pixels to be pixel value Px of a second luminance image.

Combining unit 102 combines pixel values determined by luminance adding unit 101, and generates a second luminance image (IR image).

According to Configuration example 3 of luminance image generator 9, it is possible to reduce a processing load required for generating a second luminance image.

[2.0 Operation of Distance Measurement Device 1]

The following describes an image generation method as an operation example of distance measurement device 1 that is configured as has been described above.

First, an example of overall operation performed in an image generation method employed by distance measurement device 1 will be described.

FIG. 6 is a flowchart illustrating an example of overall processing performed by distance measurement device 1 according to the embodiment.

FIG. 6 illustrates an image generation method performed by distance measurement device 1. First, image capturer 2 captures N segmental images corresponding to N segmental distances into which a distance measurement range is divided (S1). Furthermore, range image generator 8 generates a range image from the N segmental images (S2), and luminance image generator 9 generates luminance images from the N segmental images (S3).

Next, an example of processing performed for capturing N segmental images will be described.

FIG. 7 is a flowchart illustrating an example of processing performed for capturing segmental images in step S1 of FIG. 6. Loop 1 (S11 through S14) illustrated in FIG. 7 shows a cycle performed by image capturer 2 for generating a segmental image, and is performed N times for generating N segmental images. In the kth cycle among N cycles to be performed, image capturer 2 emits light in time slot Ts1 Illustrated in FIG. 2 and is exposed to light in time slot Tsk (S12). Then image capturer 2 stores segmental image #k obtained by the exposure in memory 7 (S13).

Image capturer 2 generates segmental images #1 through #N as described above.

Next, an example of range image generation processing performed by range image generator 8 will be described.

Figure 8:
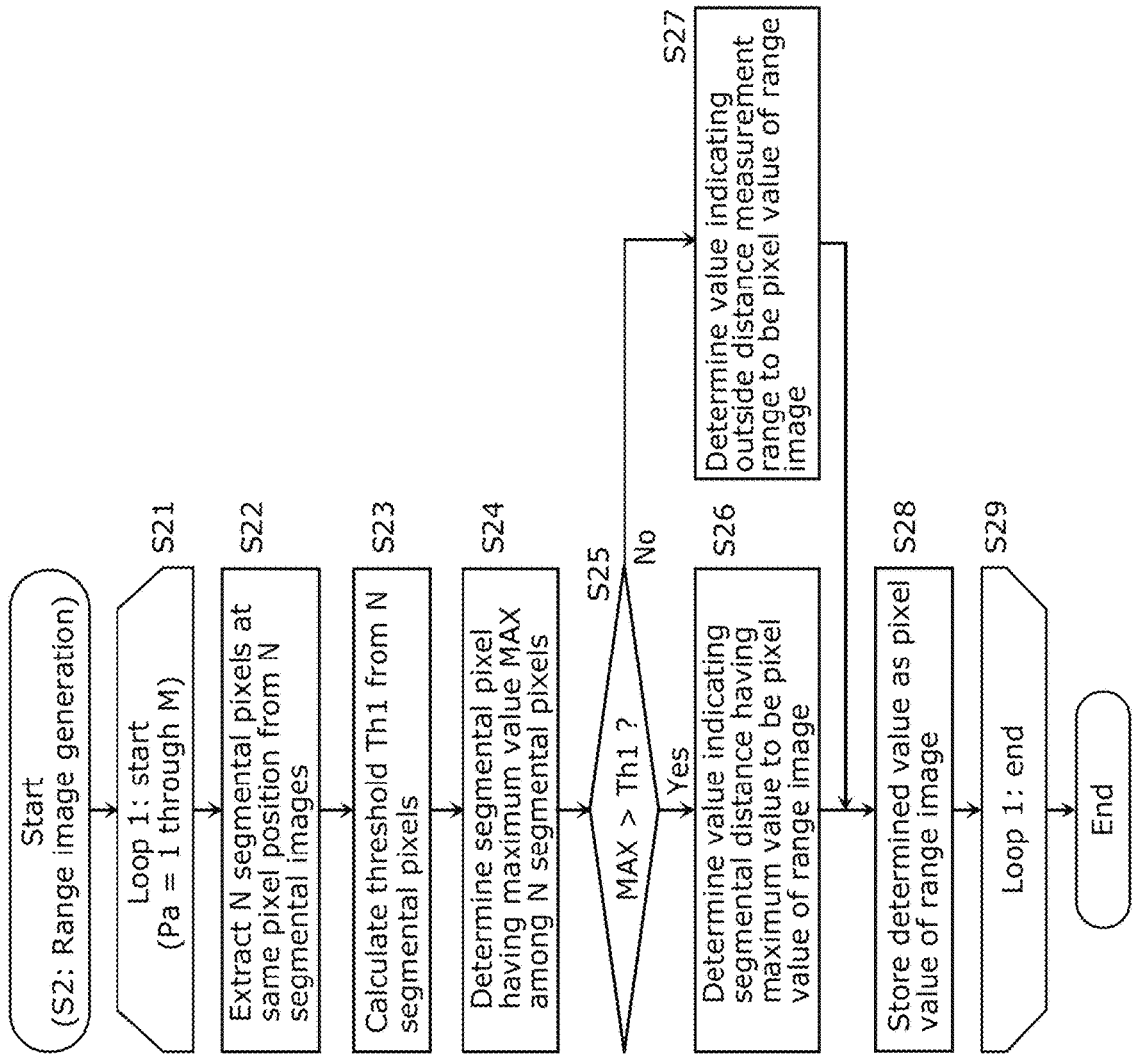
FIG. 8 is a flowchart illustrating an example of range image generation processing shown in FIG. 4 and step S2 of FIG. 6.

FIG. 8 is a flowchart illustrating an example of range image generation processing shown in FIG. 4 and step S2 of FIG. 6. Loop 1 (S21 through S29) illustrated in FIG. 8 shows a cycle to be performed M times, where M denotes the number of pixels included in a luminance image. One cycle is performed for segmental pixels #1 through #N at the same pixel position Pa (or pixel address Pa). In one cycle, range image generator 8 extracts, to begin with, N segmental pixels #1 through #N at the same pixel position Pa among segmental pixels included in N segmental images #1 through #N (S22), calculates threshold Th1 from N segmental pixels #1 through #N (S23), and determines a segmental pixel having the maximum value MAX1 among N segmental pixels #1 through #N (S24). Furthermore, range image generator 8 determines whether the maximum value MAX1 is greater than threshold Th1 (S25). When it is determined that the maximum value MAX1 is greater than threshold Th1, range image generator 8 determines a value indicating a segmental distance of the segmental pixel having the maximum value MAX1 to be a pixel value of the pixel position in a range image (S26). Alternatively, when it is determined that the maximum value MAX1 is not greater than threshold Th1, range image generator 8 determines a value indicating absence of a subject within a distance measurement range to be a pixel value of the pixel position in the range image (S27). Moreover, combining unit 86 stores values determined in steps S26 and S27 as pixel values of a range Image (S28).

Note that range image generator 8 may determine, in step S24, a segmental pixel having the maximum value MAX1 and a segmental pixel having the second largest value MAX2, and may determine, in step S26, the mean value of the segmental pixel having the maximum value MAX1 and the segmental pixel having the second largest value MAX2 to be a pixel value of a pixel position in the range image, when the segmental pixel having the maximum value MAX1 and the segmental pixel having the second largest value MAX2 belong to two adjacent segmental distances.

Next, an example of a threshold Th1 calculation performed by threshold calculator 82 will be described.

Figure 9:
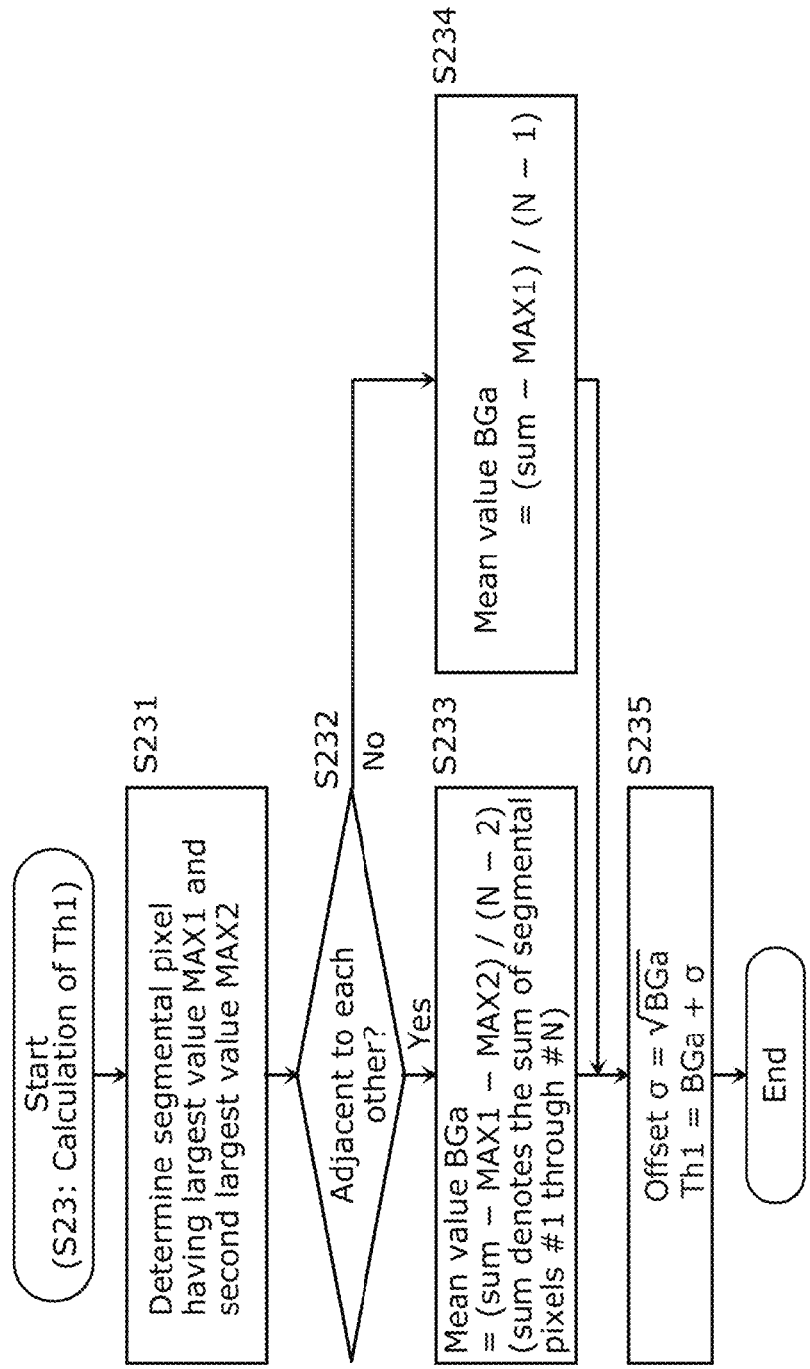
FIG. 9 is a flowchart illustrating an example of a threshold calculation performed in step S23 of FIG. 8.

FIG. 9 is a flowchart illustrating an example of a threshold calculation performed in step S23 of FIG. 8. In FIG. 9, threshold calculator 82 determines, among N segmental pixels, a segmental pixel having the maximum value MAX1 and a segmental pixel having the second largest value MAX2 (S231), and determines whether a segmental distance of the segmental pixel having the maximum value MAX1 and a segmental distance of the segmental pixel having the second largest value MAX2 are adjacent to each other (S232). Furthermore, when the two segmental distances are adjacent to each other, threshold calculator 82 calculates mean value BGa using expression (15) (S233).

$$BGa = (\text{sum} - MAX1 - MAX2)/(N-2) \qquad \text{expression (15)}$$

Here, the term sum denotes the sum of pixel signal levels of segmental pixels #1 through #N. The term BGa denotes the mean level of background light from which reflected light is excluded.

Alternatively, when the two segmental distances are not adjacent to each other, threshold calculator 82 calculates mean value BGa using expression (16) (S234).

$$BGa = (\text{sum} - MAX1)/(N-1) \qquad \text{expression (16)}$$

Moreover, threshold calculator 82 calculates threshold Th1 by adding offset σ to mean value BGa. Offset a may be, for example, the square root of mean value BGa.

As has been described, threshold Th1 is dynamically calculated for each pixel position. Accordingly, threshold Th1 is calculated to be an appropriate value, even when background light changes or shot noise occurs in background light.

Next, Processing example 1 of generation of a first luminance image (BG image) and a second luminance image (IR Image) performed by luminance image generator 9 will be described.

Figure 10:
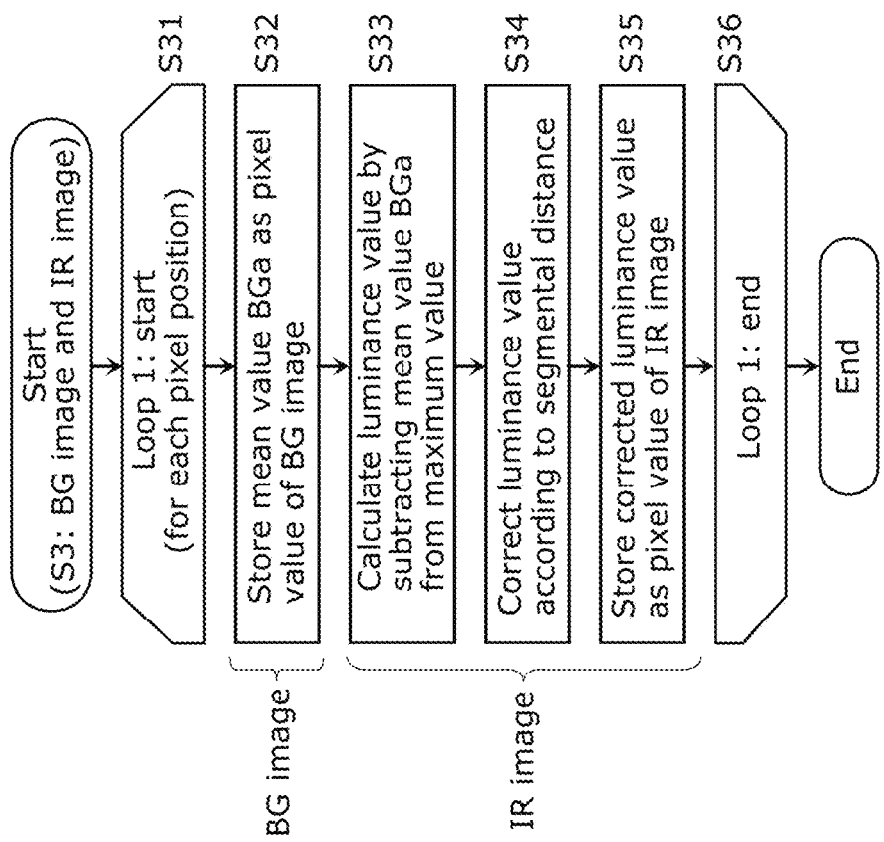
FIG. 10 is a flowchart illustrating Processing example 1 of luminance image generation shown in FIG. 5A and step S3 of FIG. 6.

FIG. 10 is a flowchart illustrating Processing example 1 of luminance image generation shown in FIG. 5A and step S3 of FIG. 6. Luminance image generator 9 according to FIG. 10 has a configuration illustrated in Configuration example 1 shown in FIG. 5A. Loop 1 (S31 through S36) illustrated in FIG. 10 shows a cycle performed for each pixel position. In one cycle, luminance Image generator 9 determines a value corresponding to mean value BGa of a pixel position to be a pixel value of a first luminance image (BG image), and stores the determined pixel value (S32). Furthermore, luminance image generator 9 calculates a luminance value by subtracting mean value BGa from the maximum value MAX1 (S33), corrects the luminance value according to a segmental distance of the maximum value MAX1 (S34), and determines the corrected value to be a pixel value of a second luminance image (IR image) and stores the corrected value (S35).

Steps S32 and S33 will be described in detail with reference to FIG. 11.

Figure 11:
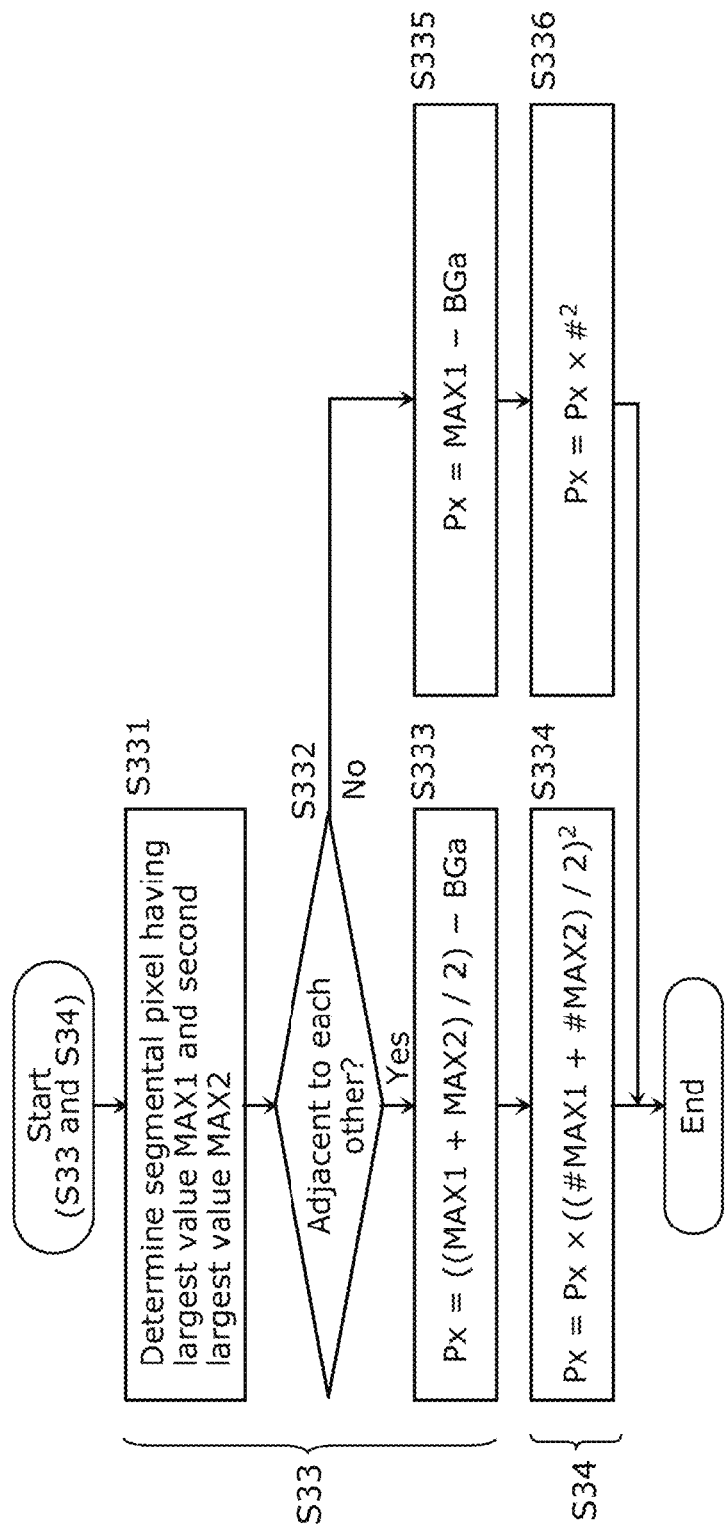
FIG. 11 is a flowchart illustrating a specific example of steps S33 and S34 shown in FIG. 10.

FIG. 11 is a flowchart Illustrating a specific example of steps S33 and S34 shown in FIG. 10. In FIG. 11, luminance image generator 9 determines, among N segmental pixels, a segmental pixel having the maximum value MAX1 and a segmental pixel having the second largest value MAX2 (S331), and determines whether a segmental distance of the segmental pixel having the maximum value MAX1 and a segmental distance of the segmental pixel having the second largest value MAX2 are adjacent to each other (S332).

Furthermore, when the two segmental distances are adjacent to each other, luminance image generator 9 calculates luminance value Px using expression (17) (S333), and corrects luminance value Px using expression (18) (S334).

$$Px = ((MAX1 + MAX2)/2) - BGa \quad \text{expression (17)}$$

$$Px = Px \times ((\#MAX1 + \#MAX2)/2)^2 \quad \text{expression (18)}$$

Here, the term #MAX1 denotes a distance value of a segmental distance of the segmental pixel having the maximum value MAX1. The term #MAX2 denotes a distance value of a segmental distance of the segmental pixel having the second largest value MAX2.

Furthermore, when the two segmental distances are not adjacent to each other, luminance image generator 9 calculates luminance value Px using expression (19) (S335), and corrects luminance value Px using expression (20) (S336).

$$Px = MAX1 - BGa \quad \text{expression (19)}$$

$$Px = Px \times \#MAX1^2 \quad \text{expression (20)}$$

Corrected pixel values Px corrected in steps S334 and S336 are stored as pixels of the second luminance image (IR image).

Since expression (17) and expression (19) each exclude a background light component from a pixel signal level, it is possible to inhibit a reduction in contrast of a second luminance image due to background light. In addition, correction made using expression (18) and expression (20) corrects a signal level of reflected light which is inversely proportional to the square of a distance from distance measurement device 1 to a subject to a signal level independent of the distance. This correction also inhibits a reduction in contrast of a second luminance image.

Next, Processing example 2 of generation of a first luminance image (BG image) and a second luminance image (IR image) performed by luminance image generator 9 will be described.

Figure 12:
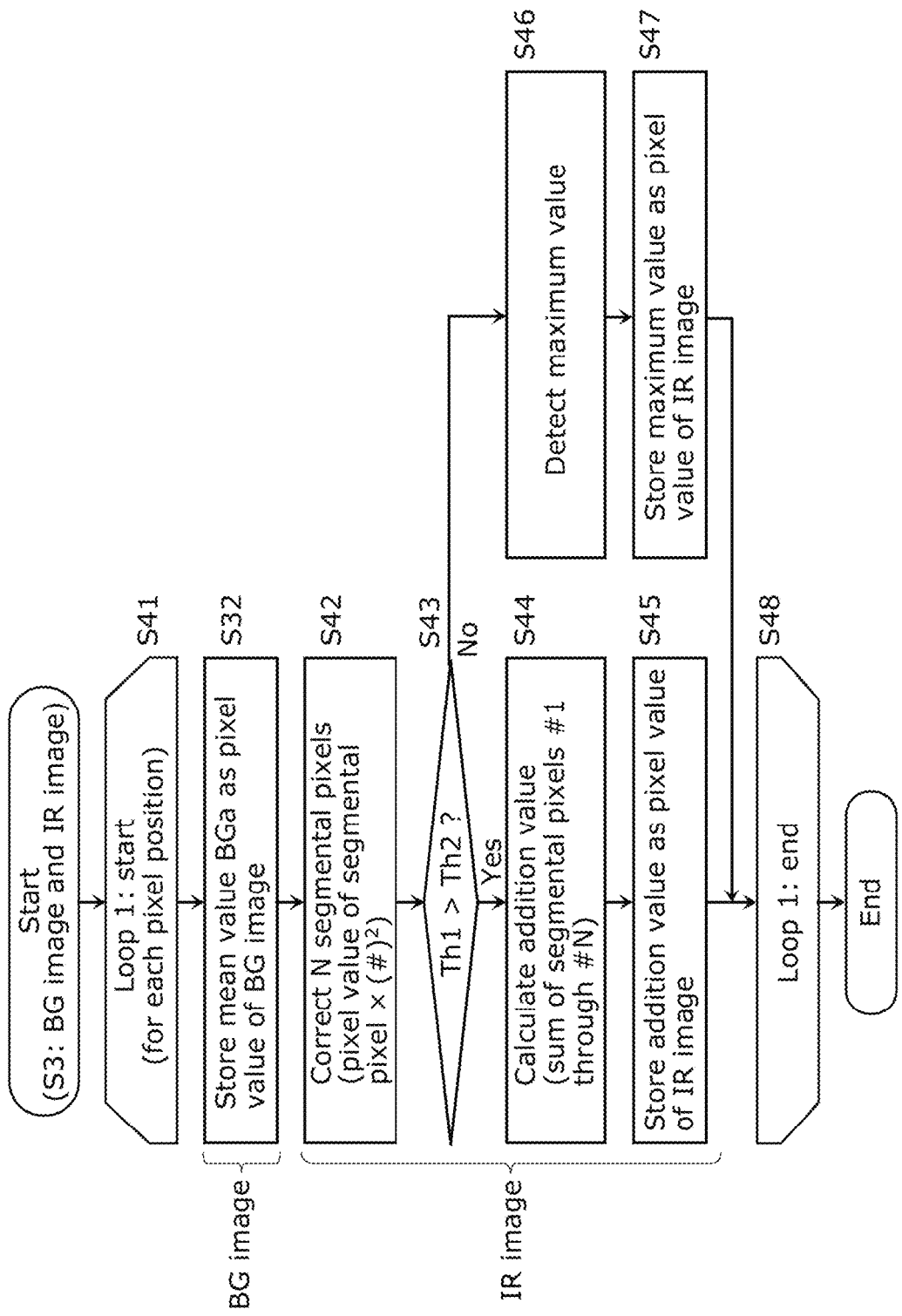
FIG. 12 is a flowchart illustrating Processing example 2 of luminance image generation shown in FIG. 5B and step S3 of FIG. 6.

FIG. 12 is a flowchart illustrating Processing example 2 of luminance image generation shown in FIG. 5B and step S3 of FIG. 6. Luminance image generator 9 according to FIG. 12 has a configuration illustrated in Configuration example 2 shown in FIG. 5B. In FIG. 12, step S32 performed for generating a first luminance image (BG image) is the same as step S32 performed in FIG. 10. The following mainly describes the generation of a second luminance image (IR image). Luminance image generator 9 corrects a pixel value of each of N segmental pixels using the square of a segmental distance corresponding to each of N segmental pixels (S42). The symbol # in the drawing denotes a segmental distance corresponding to each of N segmental pixels. The symbol # may be any one of the central value, the maximum value, and the minimum value within the range of the segmental distance.

Furthermore, luminance image generator 9 determines whether threshold Th1 is greater than predetermined value Th2 (S43). When it is determined that threshold Th1 is greater than predetermined value Th2, luminance image generator 9 calculates an addition value by adding pixel values of N segmental pixels (S44), and determines the addition value to be a pixel value of the second luminance image and stores the determined pixel value (S45). Alternatively, when it is determined that threshold Th1 is not greater than predetermined value Th2, luminance image generator 9 detects the maximum value from N segmental pixels (S46), and determines the maximum value to be a pixel value of the second luminance image and stores the determined pixel value (S47).

Note that luminance image generator 9 detects, in step S46, MAX1 and MAX2 as maximum values, and determines, in step S47, (i) the mean of MAX1 and MAX2 to be the maximum value when MAX1 and MAX2 belong to adjacent segmental distances, and (ii) MAX1 to be the maximum value when MAX1 and MAX2 do not belong to adjacent segmental distances.

According to Processing example 2 shown in FIG. 12, a signal level of background light can be corrected to a signal level independent of a distance to inhibit a reduction in contrast of a second luminance image.

Next, Processing example 3 of generation of a first luminance image (BG image) and a second luminance image (IR image) performed by luminance image generator 9 will be described.

Figure 13:
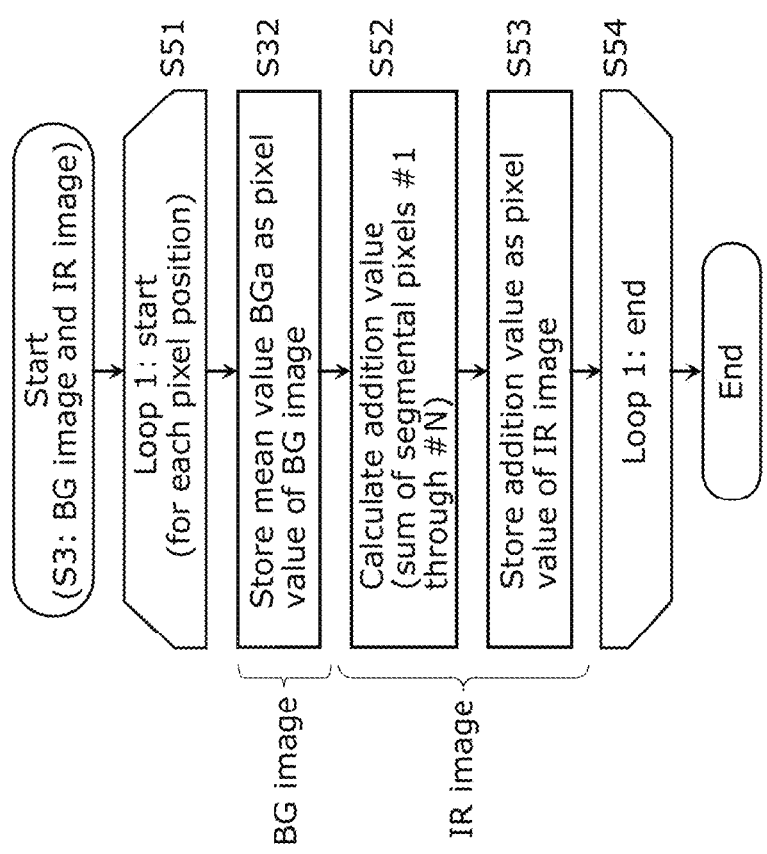
FIG. 13 is a flowchart illustrating Processing example 3 of luminance image generation shown in FIG. 5C and step S3 of FIG. 6.

FIG. 13 is a flowchart illustrating Processing example 3 of luminance image generation shown in FIG. 5C and step S3 of FIG. 6. Luminance image generator 9 according to FIG. 13 has a configuration illustrated in Configuration example 3 shown in FIG. 5C. In FIG. 13, step S32 performed for generating a first luminance image (BG image) is the same as step S32 performed in FIG. 10. The following mainly describes the generation of a second luminance image (IR image). Luminance image generator 9 calculates an addition value by adding pixel values of N segmental pixels (S52), and determines the addition value to be a pixel value of a second luminance image and stores the determined pixel value (S53).

As has been described above, distance measurement device 1 according to the embodiment inhibits (i) a reduction in accuracy of a range image, (ii) a reduction in contrast of a first luminance image (BG image) and a second luminance image (IR image), and (iii) a false measurement of measuring a distance due to background light, when a subject is not present within a distance measurable area.

Next, an example of a range image and a luminance image will be described.

Figure 14:
FIG. 14 is a diagram illustrating an example of a luminance image according to the embodiment.
Figure 15A:
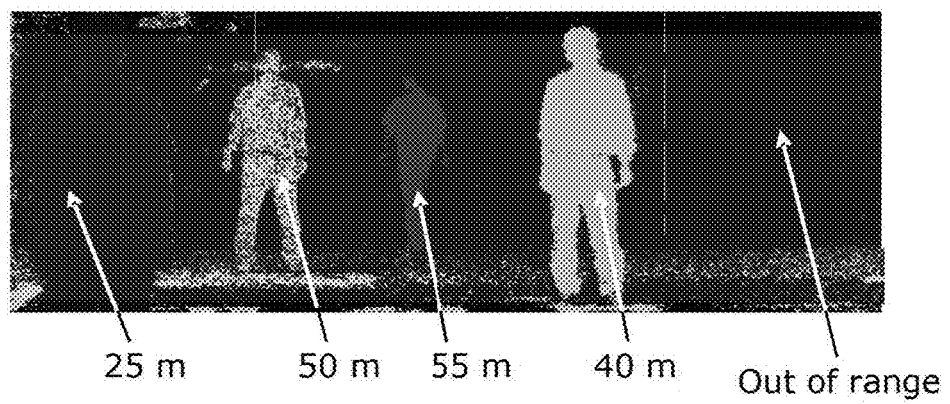
FIG. 15A is a diagram illustrating an example of a range image according to the embodiment.
Figure 15B:
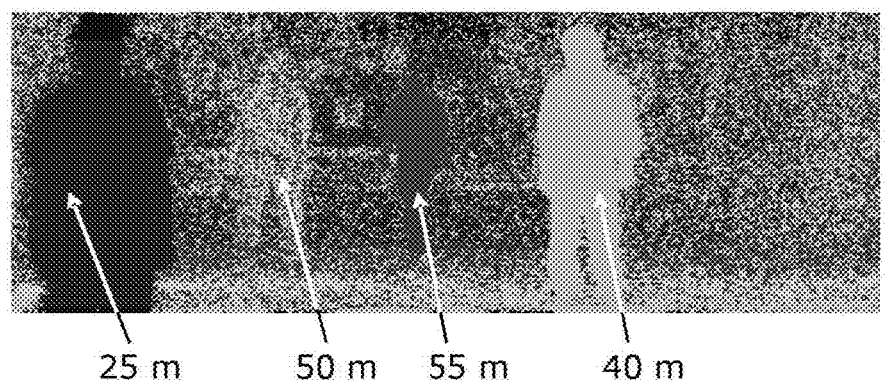
FIG. 15B is a diagram illustrating an example of a range image according to a comparative example.

FIG. 14 is a diagram illustrating an example of a luminance image according to the embodiment. FIG. 14 illustrates a second luminance image (IR image) generated by luminance image generator 9 illustrated in FIG. 5C. FIG. 15A is a diagram illustrating an example of a range image according to the embodiment. FIG. 15A illustrates a range image generated by range image generator 8 illustrated in FIG. 4. FIG. 15B is a diagram illustrating an example of a range image according to a comparative example. FIG. 15B illustrates an example of a range image obtained by range image generator 8 illustrated in FIG. 4 in the case where threshold Th1 of each pixel position is forcibly fixed to zero.

FIG. 15A shows, from left, four distance values 25 m, 50 m, 55 m, and 40 m which are relative to four subjects (people). In addition, an area indicated as "out of range" is an area indicated in black where no subject (person) is present. The "out of range" area explicitly indicates absence of a subject within a distance measurement range.

Similarly, FIG. 15B shows, from left, four distance values 25 m, 50 m, 55 m, and 40 m which are relative to four subjects (people). However, since an area in FIG. 15B which corresponds to an area indicating "out of range" in FIG. 15A indicates some distance values, occurrences of noise or false measurement can be perceived. In this respect, it is apparent that noise or false measurement is inhibited in FIG. 15A.

As has been described above, distance measurement device 1 according to the embodiment includes: image capturer 2 that captures N (N is an integer of 2 or more)

segmental images corresponding to N segmental distances into which a distance measurement range is divided; and range image generator 8 that generates a range image from the N segmental images. Range image generator 8 determines: among segmental pixels included in the N segmental images, a segmental pixel having a maximum signal value from N segmental pixels at the same pixel position among pixel positions of the N segmental images; a value indicating a segmental distance of the segmental pixel having the maximum signal value to be a distance value of the pixel position of the range image, when the maximum signal value is greater than or equal to a threshold; and a value indicating a value outside the distance measurement range to be the distance value of the pixel position of the range image, when the maximum signal value is less than the threshold.

Accordingly, it is possible to inhibit a reduction in accuracy of a range image, and a false measurement of measuring a distance due to background light when a subject is not present within a distance measurable area.

Here, range image generator 8 may determine a value indicating a value outside a distance measurement range to be a distance value of a pixel position in a range image, when the maximum signal value is less than the threshold.

Here, range image generator 8 may dynamically calculate the threshold according to signal values of the N segmental pixels.

Accordingly, it is possible to inhibit a reduction in distance measurement accuracy due to background light since the threshold is dynamically calculated for each pixel position even when background light greatly changes by being dependent on an environment of the distance measurement device, or even when background light varies due to an occurrence of shot noise in the background light.

Here, for each of the pixel positions, range image generator 8 may: exclude at least one segmental pixel including the segmental pixel having the maximum signal value from the N segmental pixels; calculate a mean value of segmental pixels remaining after exclusion of the at least one segmental pixel; and calculate the threshold based on the mean value.

The above mean value Indicates the mean of background light not including a reflected wave component. Accordingly, the use of a threshold calculated based on the mean value inhibits a reduction in distance measurement accuracy.

Here, the at least one segmental pixel may include two segmental pixels which are the segmental pixel having the maximum signal value and a segmental pixel having the second largest signal value among the N segmental pixels. The two segmental pixels may belong to two adjacent segmental distances.

Here, the at least one segmental pixel may include a single segmental pixel which is the segmental pixel having the maximum signal value, when two segmental pixels which are the segmental pixel having the maximum signal value and a segmental pixel having the second largest signal value do not belong to two adjacent segmental distances.

Accordingly, it is possible to appropriately exclude a reflected light component in the mean value calculation, even whether or not the maximum signal value and the second largest signal value belong to adjacent segmental distances.

Here, the image capturer may capture the N segmental images by repeatedly performing a set of pulsed light emission and an exposure N times, and a pulse width of the exposure may correspond to a pulse width of the pulsed light emission.

Here, the distance measurement device may include luminance image generator 9 that generates a luminance image from the N segmental images, and for each of the pixel positions, luminance image generator 9 may determine a value corresponding to the mean value to be a pixel value of the luminance image.

Accordingly, it is possible to generate, using background light, a luminance image (BG image) independent of reflected light.

Here, the distance measurement device may Include luminance image generator 9 that generates a luminance image from the N segmental images, and for each of the pixel positions, luminance image generator 9 may determine a value corresponding to a value obtained by subtracting the mean value from the maximum signal value to be a pixel value of the luminance image.

Accordingly, it is possible to inhibit a reduction in contrast of a luminance image due to background light, since the mean value indicating the mean level of background light is subtracted from the maximum signal value.

Here, the distance measurement device may Include luminance image generator 9 that generates a luminance image from the N segmental images. For each of the pixel positions, luminance image generator 9 may determine: a value corresponding to a sum of pixel signal levels of the N segmental pixels to be a pixel value of the luminance image, when the threshold is greater than a predetermined value; and a value corresponding to the maximum signal value to be a pixel value of the luminance image, when the threshold is not greater than the predetermined value.

Accordingly, it is possible to inhibit a reduction in contrast of a luminance image due to background light.

Here, the distance measurement device may include luminance image generator 9 that generates a luminance image from the N segmental images, and for each of the pixel positions, luminance image generator 9 determines a value corresponding to a sum of pixel signal levels of the N segmental pixels to be a pixel value of the luminance image.

Accordingly, it is possible to inhibit a reduction in contrast of a luminance image due to background light.

Here, the image capturer may capture the N segmental images by repeatedly performing a set of pulsed light emission and an exposure N times, and the distance measurement device may include luminance image generator 9 that generates, from the N segmental images, (i) a first luminance image independent of reflected light resulting from the pulsed light emission, and (ii) a second luminance image dependent on reflected light resulting from the pulsed light emission.

Accordingly, it is possible to inhibit a reduction in contrast of at least one of the first luminance image and the second luminance image due to background light, since the first luminance image independent of reflected light and the second luminance image dependent on reflected light are generated in addition to the range image.

Here, the distance measurement device may include luminance image generator 9 that generates a first luminance image and a second luminance image from the N segmental images. For each of the pixel positions, luminance image generator 9 may determine: a value corresponding to the mean value to be a pixel value of the first luminance image; and a value corresponding to a value obtained by subtracting the mean value from the maximum signal value to be a pixel value of the second luminance image.

Accordingly, it is possible to inhibit a reduction in contrast of a luminance image due to background light, since the mean value indicating the mean level of background light is subtracted from the maximum signal value.

Here, the distance measurement device may include luminance image generator 9 that generates a first luminance image and a second luminance image from the N segmental images. For each of the pixel positions, luminance image generator 9 may determine: a value corresponding to the mean value to be a pixel value of the first luminance image; a value corresponding to a sum of pixel signal levels of the N segmental pixels to be a pixel value of the second luminance image, when the threshold is greater than a predetermined value; and a value corresponding to the maximum signal value to be a pixel value of the second luminance image, when the threshold is not greater than the predetermined value.

Accordingly, it is possible to inhibit a reduction in contrast of a luminance image due to background light.

Here, the distance measurement device may include luminance image generator 9 that generates a first luminance image and a second luminance image from the N segmental Images. For each of the pixel positions, luminance image generator 9 may determine: a value corresponding to the mean value to be a pixel value of the first luminance image; and a value corresponding to a sum of pixel signal levels of the N segmental pixels to be a pixel value of the second luminance image.

Accordingly, it is possible to inhibit a reduction in contrast of a luminance image due to background light.

Here, luminance image generator 9 may correct the value obtained by subtracting the mean value from the maximum signal value using a square of a segmental distance corresponding to the maximum signal value.

This allows a signal level of reflected light which is inversely proportional to the square of a distance from the distance measurement device to a subject to be corrected to a signal level independent of the distance, thereby further inhibiting a reduction in image quality (e.g., contrast) of the second luminance image.

Here, when the threshold is greater than the predetermined value, luminance image generator 9 may correct a pixel value of each of the N segmental pixels using a square of a segmental distance corresponding to the each of the N segmental pixels, and may determine a value corresponding to a sum of corrected pixel values of the N segmental pixels to be a pixel value of the luminance image.

The correction of a signal level of a segmental pixel to a signal level independent of a distance makes it possible to inhibit a reduction in contrast of the second luminance image.

Here, image capturer 2 may include: light emitter 4 that emits illumination light according to a light emission pulse; light receiver 5 that captures the N segmental images by being exposed to light according to an exposure pulse; and controller 6 that generates, per range image, N sets of the light emission pulse and the exposure pulse to control the light emitter and the light receiver. The range image is the range image generated from the N segmental Images. Each of time differences between light emission pulses and exposure pulses of the N sets of the light emission pulse and the exposure pulse corresponds to a different one of the N segmental distances.

Accordingly, it is possible to readily generate N segmental images.

In addition, an image generation method is an image generation method for generating a range image. The image generation method includes: capturing N (N is an integer of 2 or more) segmental images corresponding to N segmental distances into which a distance measurement range is divided; determining, among segmental pixels included in the N segmental images, a segmental pixel having a maximum signal value from N segmental pixels at the same pixel position among pixel positions of the N segmental images; determining a value indicating a segmental distance of the segmental pixel having the maximum signal value to be a distance value of the pixel position of the range image, when the maximum signal value is greater than or equal to a threshold; and determining a value indicating a value outside the distance measurement range to be the distance value of the pixel position of the range image, when the maximum signal value is less than the threshold.

Accordingly, it is possible to inhibit a reduction in accuracy of a range image, and a false measurement of measuring a distance due to background light when a subject is not present within a distance measurable area.

The foregoing has described distance measurement device 1 and an image generation method according to the present disclosure based on the embodiments, yet the present disclosure is not limited to the embodiments. Embodiments arrived at by a person of skill in the art making various modifications to the embodiments as well as embodiments realized by optionally combining structural elements in the embodiments and the variation which do not depart from the essence of the present invention are included in the scope of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is suitable for a distance measurement device and an image generation method. For example, the present disclosure is suitable for a TOF camera system.

The invention claimed is:

1. A distance measurement device, comprising:
   an image capturer that captures N segmental images corresponding to N segmental distances into which a distance measurement range is divided, N being an integer of 2 or more; and
   a range image generator that generates a range image from the N segmental images, wherein
   the range image generator determines:
   among segmental pixels included in the N segmental images, a segmental pixel having a maximum signal value from N segmental pixels at a pixel position among pixel positions, the pixel position being a same pixel position in the N segmental images;
   a value indicating a segmental distance of the segmental pixel having the maximum signal value to be a distance value of the pixel position of the range Image, when the maximum signal value is greater than or equal to a threshold; and
   a value indicating a value outside the distance measurement range to be the distance value of the pixel position of the range image, when the maximum signal value is less than the threshold,
   wherein for each of the pixel positions, the range image generator:

excludes at least one segmental pixel including the segmental pixel having the maximum signal value from the N segmental pixels;
calculates a mean value of segmental pixels remaining after exclusion of the at least one segmental pixel; and
calculates the threshold based on the mean value.

2. The distance measurement device according to claim 1, wherein
the range image generator dynamically calculates the threshold according to signal values of the N segmental pixels.

3. The distance measurement device according to claim 2, wherein
the at least one segmental pixel includes two segmental pixels which are the segmental pixel having the maximum signal value and a segmental pixel having a second largest signal value among the N segmental pixels, and
the two segmental pixels belong to two adjacent segmental distances.

4. The distance measurement device according to claim 3, wherein
the at least one segmental pixel includes a single segmental pixel which is the segmental pixel having the maximum signal value, when two segmental pixels do not belong to two adjacent segmental distances, the two segmental pixels being the segmental pixel having the maximum signal value and a segmental pixel having the second largest signal value.

5. The distance measurement device according to claim 3, wherein
the image capturer captures the N segmental images by repeatedly performing a set of pulsed light emission and an exposure N times, and
a pulse width of the exposure corresponds to a pulse width of the pulsed light emission.

6. The distance measurement device according to claim 1, further comprising:
a luminance image generator that generates a luminance image from the N segmental images, wherein
for each of the pixel positions, the luminance image generator determines a value corresponding to the mean value to be a pixel value of the luminance image.

7. The distance measurement device according to claim 1, further comprising:
a luminance image generator that generates a luminance image from the N segmental images, wherein
for each of the pixel positions, the luminance image generator determines a value corresponding to a value obtained by subtracting the mean value from the maximum signal value to be a pixel value of the luminance image.

8. The distance measurement device according to claim 1, further comprising:
a luminance image generator that generates a luminance image from the N segmental images, wherein
for each of the pixel positions, the luminance image generator determines:
a value corresponding to a sum of pixel signal levels of the N segmental pixels to be a pixel value of the luminance image, when the threshold is greater than a predetermined value; and
a value corresponding to the maximum signal value to be a pixel value of the luminance image, when the threshold is not greater than the predetermined value.

9. The distance measurement device according to claim 1, further comprising:
a luminance image generator that generates a luminance image from the N segmental images, wherein
for each of the pixel positions, the luminance image generator determines a value corresponding to a sum of pixel signal levels of the N segmental pixels to be a pixel value of the luminance image.

10. The distance measurement device according to claim 1, wherein
the image capturer captures the N segmental images by repeatedly performing a set of pulsed light emission and an exposure N times, and
the distance measurement device comprises a luminance image generator that generates, from the N segmental images, (i) a first luminance image independent of reflected light resulting from the pulsed light emission, and (ii) a second luminance image dependent on reflected light resulting from the pulsed light emission.

11. The distance measurement device according to claim 1, further comprising:
a luminance image generator that generates a first luminance image and a second luminance image from the N segmental images, wherein
for each of the pixel positions, the luminance image generator determines:
a value corresponding to the mean value to be a pixel value of the first luminance image; and
a value corresponding to a value obtained by subtracting the mean value from the maximum signal value to be a pixel value of the second luminance image.

12. The distance measurement device according to claim 1, further comprising:
a luminance image generator that generates a first luminance image and a second luminance image from the N segmental images, wherein
for each of the pixel positions, the luminance image generator determines:
a value corresponding to the mean value to be a pixel value of the first luminance image;
a value corresponding to a sum of pixel signal levels of the N segmental pixels to be a pixel value of the second luminance image, when the threshold is greater than a predetermined value; and
a value corresponding to the maximum signal value to be a pixel value of the second luminance image, when the threshold is not greater than the predetermined value.

13. The distance measurement device according to claim 1, further comprising:
a luminance image generator that generates a first luminance image and a second luminance image from the N segmental images, wherein
for each of the pixel positions, the luminance image generator determines:
a value corresponding to the mean value to be a pixel value of the first luminance image; and
a value corresponding to a sum of pixel signal levels of the N segmental pixels to be a pixel value of the second luminance image.

14. The distance measurement device according to claim 7, wherein
the luminance image generator corrects the value obtained by subtracting the mean value from the maximum signal value using a square of a segmental distance corresponding to the maximum signal value.

15. The distance measurement device according to claim 8, wherein
when the threshold is greater than the predetermined value, the luminance image generator corrects a pixel value of each of the N segmental pixels using a square of a segmental distance corresponding to the each of the N segmental pixels, and determines a value corresponding to a sum of corrected pixel values of the N segmental pixels to be a pixel value of the luminance image.

16. The distance measurement device according to claim 1, wherein
the image capturer includes:
a light emitter that emits illumination light according to a light emission pulse;
a light receiver that captures the N segmental images by being exposed to light according to an exposure pulse; and
a controller that generates, per range image, N sets of the light emission pulse and the exposure pulse to control the light emitter and the light receiver, the range image being the range image generated from the N segmental images, and
each of time differences between light emission pulses and exposure pulses of the N sets of the light emission pulse and the exposure pulse corresponds to a different one of the N segmental distances.

17. An image generation method for generating a range image, the image generation method comprising:
capturing N segmental images corresponding to N segmental distances into which a distance measurement range is divided, N being an integer of 2 or more;
determining, among segmental pixels included in the N segmental images, a segmental pixel having a maximum signal value from N segmental pixels at a pixel position among pixel positions, the pixel position being a same pixel position in the N segmental images;
determining a value indicating a segmental distance of the segmental pixel having the maximum signal value to be a distance value of the pixel position of the range image, when the maximum signal value is greater than or equal to a threshold; and
determining a value indicating a value outside the distance measurement range to be the distance value of the pixel position of the range image, when the maximum signal value is less than the threshold,
wherein for each of the pixel positions:
excluding at least one segmental pixel including the segmental pixel having the maximum signal value from the N segmental pixels;
calculating a mean value of segmental pixels remaining after exclusion of the at least one segmental pixel; and
calculating the threshold based on the mean value.

* * * * *